2,716,619
PROCESS FOR COATING ASBESTOS-CEMENT PRODUCTS

Howell S. Jobbins, Livingston, N. J., and Walter J. Schwarz, New Orleans, La., assignors to The Patent and Licensing Corporation, New York, N. Y., a corporation of Massachusetts No Drawing. Application August 19, 1952, Serial No. 305,298

16 Claims. (Cl. 117—72)

This invention relates to a process for coating cement-asbestos products and to the product produced thereby, and more particularly to a cement-asbestos product which is water resistant, bloom resistant and has an improved appearance.

Colored cement-asbestos siding, building board and roofing shingles as heretofore produced have a tendency to develop an objectionable white haze or discoloration, which is referred to in the cement-asbestos products art as "bloom" or "efflorescence" and is hereinafter referred to as "blooming." Such white haze or discoloration is believed to be due to the migration of free calcium oxide, present in small amount in the hydraulic cement, in the form of calcium hydroxide to the surface of the products. Carbon dioxide in the atmosphere reacts with the calcium hydroxide to convert it to calcium carbonate. The calcium carbonate thus produced is of a white or grayish hue, and thus contrasts in color with that of the products, producing the above-noted objectionable white haze or discoloration.

In general, during the first six to eight months that the cement-asbestos products are exposed to the atmosphere blooming takes place, due to the leaching out by water, such as rain water, of the small amount of free calcium oxide present in the cement. At the end of six to eight months, the objectionable free calcium oxide will have been converted to calcium carbonate, and thus there will be no tendency for further blooming to take place. In the meantime, however, the calcium carbonate formed imparts an objectionable appearance to the products. Furthermore, blooming takes place during the hydration of the Portland cement and particularly when a steam curing process is employed. This may be attributable to water in the liquid phase leaching out the free calcium oxide and bringing it to the surface with consequent formation of calcium carbonate.

It has been customary in the prior art to coat cement-asbestos shingles and the like with wax which in some cases reduces the bloom and aids in making the shingle water resistant. Its bloom inhibiting power is, however, somewhat erratic and it is subject to scuffing or spotty polishing which adversely affects the appearance.

It is an object of the present invention to provide an improved cement-asbestos product which is bloom proof.

It is a further object of the present invention to provide an improved cement-asbestos product which combines the quality of being bloom proof, scuff resistant and of improved appearance.

It is a further object of the present invention to provide an improved process for treating cement-asbestos products to make them bloom proof.

These and other objects are attained by the present invention which relates to a cement-asbestos product having on the surface thereof a temporary transparent, substantially colorless film of a thickness of 0.1 mill to 2.0 mills of a solid water insoluble synthetic resin.

The invention may be best understood by reference to the following specific examples, but it will be understood that variations and substitutions may be made within the scope of the claims.

Example I

The following formulation was prepared by adding the ingredients to a suitable container and agitating thoroughly with a rotary mixer.

| | Parts by weight |
|---|---|
| Polystyrene resin (Lustrex X820) | 3.5 |
| Water (at 140–160° F.) | 26.8 |
| Glyco-glycerol monoricinolate "S" | 1.1 |
| Ammonium hydroxide 28% $NH_3$ | 1.1 |
| Butyl Benzyl phthalate (Santicizer #160) | 8.5 |
| Polystyrene resin (Lustrex 601–40) | 39.2 |
| Defoaming agent (Glyco-foamex) | 0.1 |
| Water (room temperature) | 19.7 |

The above formulation yields an emulsion containing 30% by weight polystyrene resin solids, and this should be diluted to about a 12% emulsion for application to the cement-asbestos product. The ingredients are added in the order given in the formulation.

The polystyrene resin emulsion of 12% was applied to a black roofing shingle of asbestos-cement. The shingle was pre-heated to have a surface temperature of 125° to 145° F. The solution was maintained in the temperature range of 100° to 125° F. The shingle was dipped into the emulsion solution, and the veneered face, back and edges coated. Excess emulsion was blown off with air under pressure. Mild heat applied to the face and back aided drying of the resin film. After drying it was packaged.

The shingle had an attractive lustrous wet appearance and was not tacky on the surface, and when stacked under a heavy load of other shingles the film did not show a sticking tendency. In handling in contact with other shingles, no scuffing appeared on the surface thereof. Exposure on a roof showed no bloom.

Besides inspection for appearance, the shingle was subjected to the following tests:

Ink stain test.—Approximately 2 cc. of full strength red ink was applied to the shingle. The shingle was tilted to allow the ink to roll across the shingle. After 10 seconds of ink contact time, the shingle was thoroughly flooded with tap water. The remaining stain after this treatment was only slight by visual inspection.

Water repellency test.—Tap water dropped onto the shingle showed only a slight trace of wetting after 10 seconds contact, the droplets of water rolling off readily. The thickness of the film on the shingle was 0.4 mill.

Example II

An acrylic polymer resin in emulsion form (Rhoplex WN80) having a solids content of about 40% and containing a paraffin wax emulsion in which the wax was about 10% on a solids basis of the resin, was applied by a spray method to the colored veneer surface of a cement-asbestos shingle which was heated to approximately 140° F. The excess emulsion was blown off with hot air and the product dried with a hot air blast which fused the resin to the cement-asbestos surface. The shingle obtained by this example had the same characteristics, and yielded the same test result as set forth in Example I.

The above examples may be repeated by substituting for the resins therein vinyl acetate, other acrylics, plasticized copolymer vinyl chloride and vinylidene chloride, and melamine resins, latices such as butadiene-styrene, etc. Of these above resins, some require plasticizers such as polystyrene whereas others, such as the acrylic, require no plasticizer. The acrylic is preferably used with a small amount of wax to reduce any tendency to stick in bundles under unusual temperature and pressure conditions. The acrylic polymer and the polystyrene are preferable. The films are preferably clear, but may be pigmented.

The excellent results obtained with such a very thin temporary film of the resin are indeed unexpected. It was unexpected that such a thin film would give these results, and that painting of a cement-asbestos product with a heavier pigmented film does not yield all of these desirable results. Heavier applications of the resins tend to cause sticking and introduce cracking and yellowing as well as a noticeably bad appearance as the paint wears off. The very thin film unexpectedly gives water resistance, bloom prevention and also an attractive lustrous wet appearance which improves any of the cement products, but particularly black roofing shingles. After many months in the weather the resin wears off, but by then the likelihood of bloom has passed and the wearing off of such a thin film of the resin is hardly noticeable.

The clear transparent resin produces a glossy surface on the shingle which gives more depth to texture. The coating is substantially mar-proof. It is water repellent as indicated by the ink stain test and stains and dirt marks may be washed off with soap and water. In the case of shingles having a surface decoration of small granules, the coating aids in binding the granules to the surface of the shingle.

The process is applicable to cement-asbestos products produced by the so-called Hatschek machine wet method of manufacturing cement-asbestos products in which the sheet containing a veneer of pigmented cement is cured with or without steam. The process is readily applicable to the Norton dry process. The process is preferably applied to the cured shingle but may be applied at an earlier stage, however a dry shingle is substantially preferred.

While the process can be applied to the complete shingle from any of these processes, best results are obtained with a shingle which has had an "in-process" application of wax emulsion. Before the sheets from the above process are stacked for drying and curing, they are preferably sprayed or dipped with an emulsion of carnauba wax or blends of carnauba wax with paraffin wax. The preferred wax is a carnauba wax having a melting point of at least 130° F., and the emulsion should have a solids content of 0.5 to 5%, and preferably 1 to 3%. In the case of cement-asbestos products produced by the Hatschek method and containing 25 to 30% water, from 2 to about 15 grams and preferably 8 to 10 grams of wax emulsion are applied per square foot of shingle. In the treatment of shingles produced by the Norton process, in which the water content of the product may be 20% or less, as much as 40 grams of emulsion may be applied per square foot of shingle surface.

While the present invention is preferably applicable to dark colored roofing shingles, especially black shingles, it is also applicable to other types of shingles and other colors including white. While a thickness of 0.4 mill of resin has been used in the above examples, amounts generally in the range 0.1 to 2.0 mills may be used, and preferably in the range of 0.2 to 0.8 mill. While spraying has been illustrated as the process for applying to emulsion, it may be applied by dipping the shingle or flooding the surface thereof. While solvent solutions of resin may be used, it has been found more desirable to apply the resin by means of a dilute water emulsion thus eliminating solvent removal and recovery.

We claim:

1. A process for preparing a non-blooming asbestos-cement product with a temporary coating which comprises applying to the surface of an asbestos-cement sheet a transparent substantially colorless solid water insoluble synthetic resin in a dilute liquid carrier, drying the sheet to drive off the liquid carrier, said resin being applied in an amount such that when dried the resin has a thickness of from 0.1 to 2.0 mills.

2. A process for preparing a non-blooming asbestos-cement product with a temporary coating which comprises applying to the surface of an asbestos-cement sheet a plasticized polystyrene resin in a dilute liquid carrier, drying the sheet to drive off the liquid carrier, said resin being applied in an amount such that when dried the resin has a thickness of from 0.1 to 2.0 mills.

3. A process for preparing a non-blooming asbestos-cement product with a temporary coating which comprises applying to the surface of an asbestos-cement sheet an acrylic polymer resin in a dilute liquid carrier, drying the sheet to drive off the liquid carrier, said resin being applied in an amount such that when dried the resin has a thickness of from 0.1 to 2.0 mills.

4. A process for preparing a non-blooming asbestos-cement product with a temporary coating which comprises applying to the surface of an asbestos-cement sheet a vinyl acetate resin in a dilute liquid carrier, drying the sheet to drive off the liquid carrier, said resin being applied in an amount such that when dried the resin has a thickness of from 0.1 to 2.0 mills.

5. A process for preparing a non-blooming asbestos-cement product with a temporary coating which comprises applying to the surface of an asbestos-cement sheet a vinyl chloride-vinylidene chloride copolymer resin in a dilute liquid carrier, drying the sheet to drive off the liquid carrier, said resin being applied in an amount such that when dried the resin has a thickness of from 0.1 to 2.0 mills.

6. A process for preparing a non-blooming asbestos-cement product with a temporary coating which comprises applying to the surface of an asbestos-cement sheet a melamine resin in a dilute liquid carrier, drying the sheet to drive off the liquid carrier, said resin being applied in an amount such that when dried the resin has a thickness of from 0.1 to 2.0 mills.

7. A process for preparing a non-blooming colored asbestos-cement roofing shingle with a temporary coating comprising applying to the colored surface of the shingle while still wet, an aqueous emulsion of a wax, and after stacking and curing, applying over said wax a coating of an emulsion of plasticized polystyrene resin in amount such that when dried the resin coating has a thickness of about 0.4 mill.

8. A process for preparing a non-blooming colored asbestos-cement roofing shingle with a temporary coating comprising applying to the colored surface of the shingle while still wet, an aqueous emulsion of a wax, and after stacking and curing, applying over said wax a coating of an emulsion of a mixture of paraffin wax and acrylic polymer resin in amount such that when dried the resin coating has a thickness of about 0.4 mill.

9. A non-blooming asbestos-cement product comprising a sheet of asbestos-cement having on the surface thereof a temporary film of a thickness of 0.1 mill to 2.0 mills of a solid water insoluble synthetic resin.

10. A non-blooming asbestos-cement product comprising a sheet of asbestos-cement having on the surface thereof a temporary transparent substantially colorless film of a thickness of 0.1 mill to 2.0 mills of a plasticized polystyrene resin.

11. A non-blooming asbestos-cement product comprising a sheet of asbestos-cement having on the surface thereof a temporary transparent substantially colorless film of a thickness of 0.1 mill to 2.0 mills of an acrylic polymer resin.

12. A non-blooming asbestos-cement product comprising a sheet of asbestos-cement having on the surface thereof a temporary transparent substantially colorless film of a thickness of 0.1 mill to 2.0 mills of a vinyl acetate resin.

13. A non-blooming asbestos-cement product comprising a sheet of asbestos-cement having on the surface thereof a temporary transparent substantially colorless film of a thickness of 0.1 mill to 2.0 mills of a vinyl chloride-vinylidene chloride copolymer resin.

14. A non-blooming asbestos-cement product comprising a sheet of asbestos-cement having on the surface thereof a temporary transparent substantially colorless film of a thickness of 0.1 mill to 2.0 mills of a melamine resin.

15. A non-blooming colored asbestos-cement shingle comprising a shingle having a colored veneer of pigmented cement on at least one surface thereof, said colored veneer being completely covered with a pervious film of wax and a second temporary film overlying said wax film of a plasticized polystyrene resin, said resin having a thickness of about 0.4 mill which temporary film is maintained on said surface until the likelihood of blooming has passed.

16. A non-blooming colored asbestos-cement shingle comprising a shingle having a colored veneer of pigmented cement on at least one surface thereof, said colored veneer being completely covered with a film of wax and a second temporary film overlying said wax film of a mixture of paraffin wax and acrylic polymer resin, said resin having a thickness of about 0.4 mill which temporary film is maintained on said surface until the likelihood of blooming has passed.

References Cited in the file of this patent

UNITED STATES PATENTS

| | | |
|---|---|---|
| 2,208,232 | Smolak | July 16, 1940 |
| 2,275,272 | Scripture | Mar. 3, 1942 |
| 2,307,734 | De Vault | Jan. 12, 1943 |
| 2,470,918 | Lin Chung | May 24, 1949 |
| 2,504,920 | Buckman et al. | Apr. 18, 1950 |
| 2,588,828 | Greiner | Mar. 11, 1952 |
| 2,617,746 | Parry | Nov. 11, 1952 |